Sept. 4, 1956     E. S. PURINGTON     2,762,018
REACTANCE NETWORKS WITH STRUCTURAL SYMMETRY
Filed Oct. 9, 1950     8 Sheets-Sheet 1

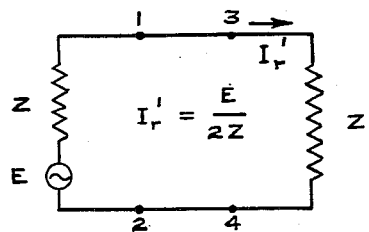

A. NETWORK ABSENT

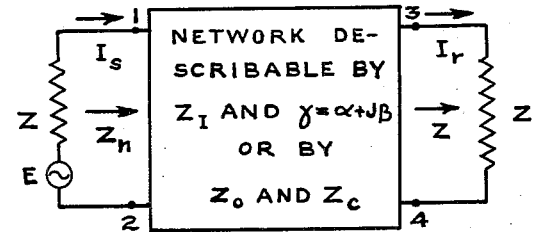

B. NETWORK INSERTED $$\text{INSERTION RATIO} = \frac{I_r'}{I_r} = \frac{E/2Z}{I_r} = (M+jN)$$

Fig. 1.

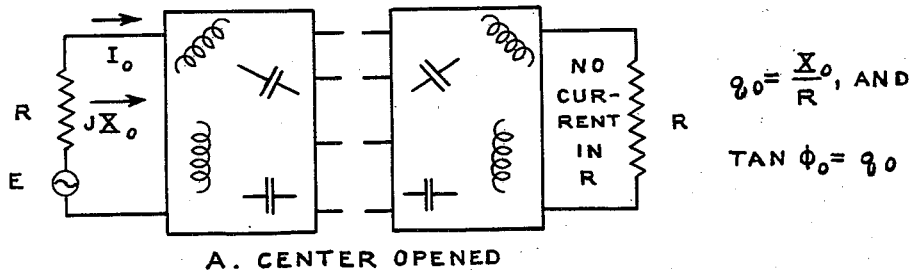

A. CENTER OPENED $q_0 = \frac{X_0}{R}$, AND

TAN $\phi_0 = q_0$

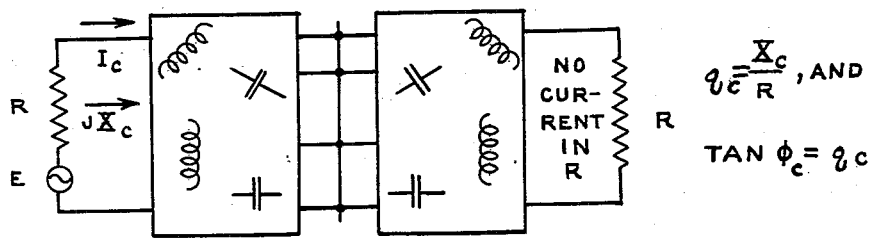

B. CENTER CLOSED $q_c = \frac{X_c}{R}$, AND

TAN $\phi_c = q_c$ $$\text{INSERTION RATIO} = \left[\frac{q_0 + q_c}{q_0 - q_c}\right] + j\left[\frac{q_0 q_c - 1}{q_0 - q_c}\right]$$

Fig. 2.

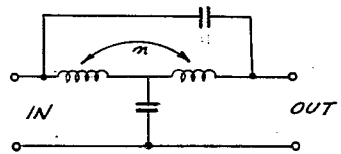

Fig. 10.

Inventor

ELLISON S. PURINGTON.

By *[signature]*

Attorney

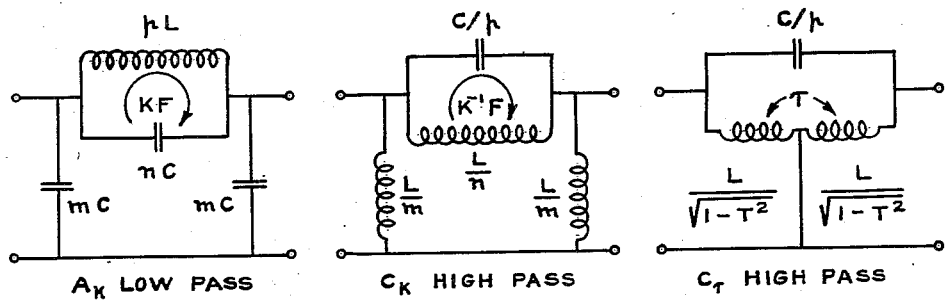
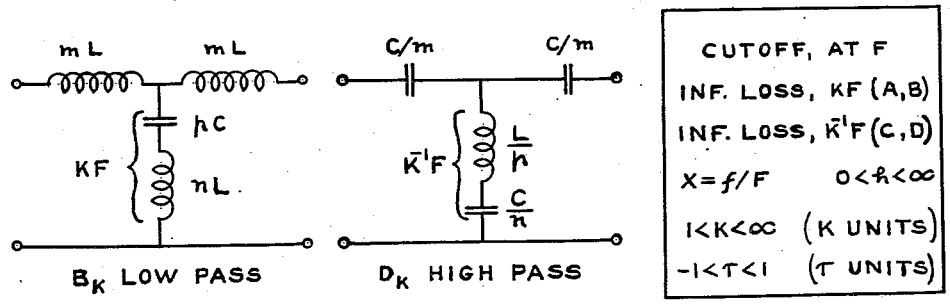
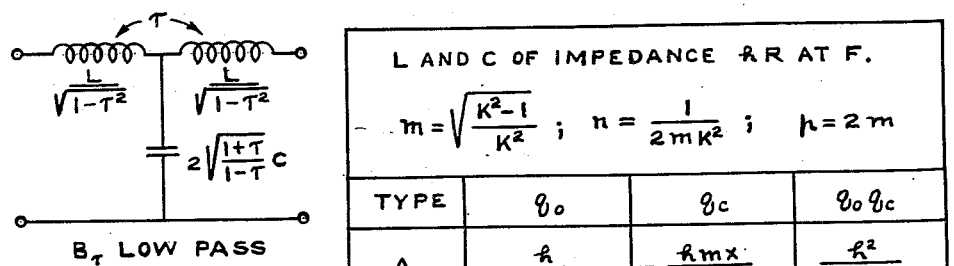
BASIC LOW AND HIGH PASS FILTER UNITS
Fig. 3.

BASIC LOW AND HIGH PASS UNITS; K=1.25, R=.6(A,C), 1.667(B,D)

LOSS AND LAG DIAGRAM

LOSS AND LAG DIAGRAM, 6 SEC. $B_T$ LINE, $T=.27$, $m=1.32$, $\hbar=1.4$

Inventor
ELLISON S. PURINGTON,
Attorney

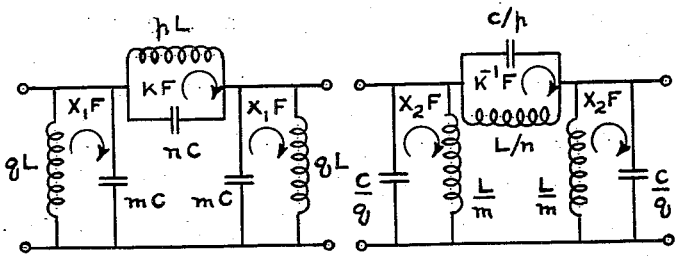
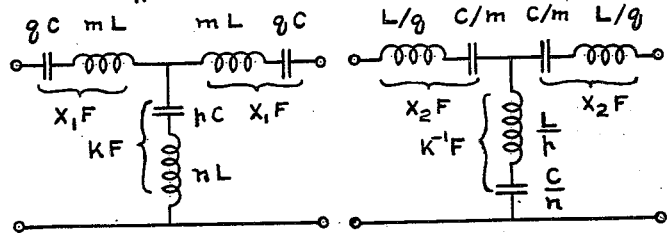
BASIC BAND PASS UNITS
Fig. 6.
Inventor
ELLISON S. PURINGTON.
By 
Attorney $d = .45$; $K = 1.5$; $h = 0.7$ for A, C; $h = 1.43$ for B, D.

LOSS AND LAG BASIC BAND PASS UNITS

Sept. 4, 1956    E. S. PURINGTON    2,762,018
REACTANCE NETWORKS WITH STRUCTURAL SYMMETRY
Filed Oct. 9, 1950    8 Sheets-Sheet 7

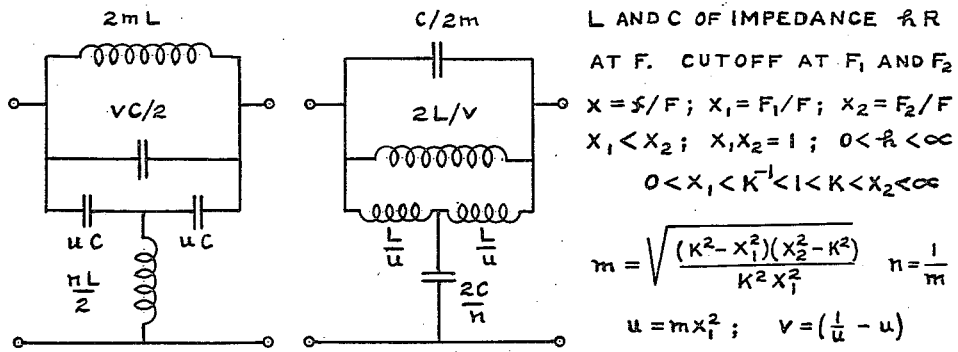

L AND C OF IMPEDANCE $\hbar R$
AT F. CUTOFF AT $F_1$ AND $F_2$
$X = f/F$; $X_1 = F_1/F$; $X_2 = F_2/F$
$X_1 < X_2$; $X_1 X_2 = 1$; $0 < \hbar < \infty$
$0 < X_1 < K^{-1} < 1 < K < X_2 < \infty$ $$m = \sqrt{\frac{(K^2 - X_1^2)(X_2^2 - K^2)}{K^2 X_1^2}} \quad n = \frac{1}{m}$$

$$u = m X_1^2; \quad v = \left(\frac{1}{u} - u\right)$$

TYPE I. BAND-ELIM.   TYPE II. BAND-ELIM.

| FORMULAS FOR CIRCUIT COMPUTATION | | | |
|---|---|---|---|
| TYPE | $y_0$ | $y_c$ | $y_0 y_c$ |
| I | $\dfrac{\hbar}{m} \dfrac{X^2 - X_2^2}{X}$ | $-\hbar m X_1^2 \dfrac{X}{X^2 - X_1^2}$ | $\hbar^2 X_1^2 \left(\dfrac{X^2 - X_2^2}{X_1^2 - X^2}\right)$ |
| II | $\dfrac{\hbar X_2^2}{m} \dfrac{X^2 - X_1^2}{X}$ | $-\hbar m \dfrac{X}{X^2 - X_2^2}$ | $\hbar^2 X_2^2 \left(\dfrac{X_1^2 - X^2}{X^2 - X_2^2}\right)$ |

| INSERTION LOSS DB = $10 \log_{10}(1 + F_{LOSS}^2)$ | |
|---|---|
| TYPE I | TYPE II |
| $F_{LOSS} = \dfrac{m(\hbar^2 - X_1^2)}{\hbar} \cdot \dfrac{X\left[\left(\frac{X}{a}\right)^2 - 1\right]}{\left[\left(\frac{X}{K^{-1}}\right)^2 - 1\right]\left[\left(\frac{X}{K}\right)^2 - 1\right]}$ | $F_{LOSS} = \dfrac{m(X_1^2 \hbar^2 - 1)}{\hbar} \cdot \dfrac{X\left[\left(\frac{X}{b}\right)^2 - 1\right]}{\left[\left(\frac{X}{K^{-1}}\right)^2 - 1\right]\left[\left(\frac{X}{K}\right)^2 - 1\right]}$ |
| $a = X_2 \sqrt{\dfrac{\hbar^2 - X_1^2}{\hbar^2 - X_2^2}}$; $\hbar = X_2 \sqrt{\dfrac{a^2 - X_1^2}{a^2 - X_2^2}}$ | $b = X_1 \sqrt{\dfrac{\hbar^2 - X_2^2}{\hbar^2 - X_1^2}}$; $\hbar = X_1 \sqrt{\dfrac{b^2 - X_2^2}{b^2 - X_1^2}}$ |

BASIC BAND ELIMINATION UNITS

Fig. 8.

Inventor
ELLISON S. PURINGTON.
By
*(signature)*
Attorney

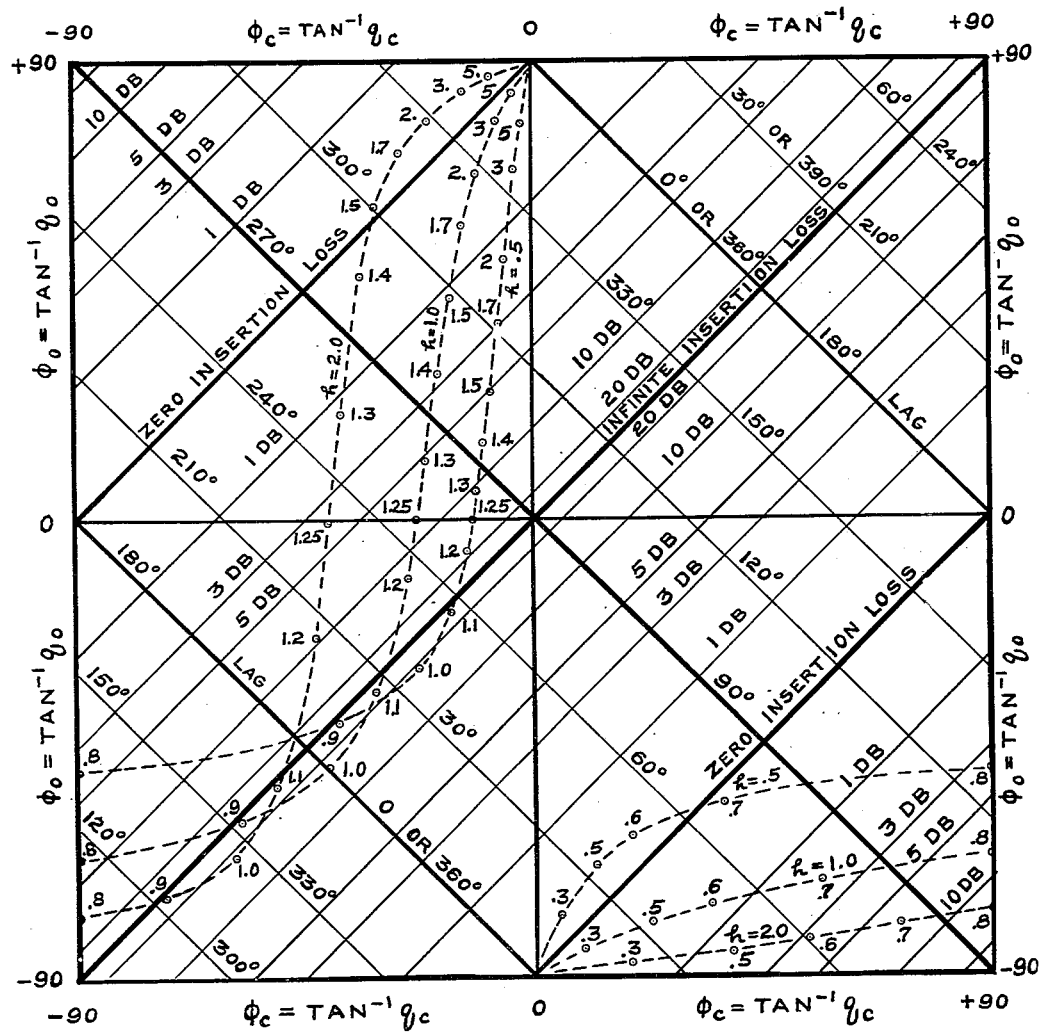
$d = .45$; $K = 1.12$; $k = .5$; $k = 1.0$ and $k = 2.0$
LOSS AND LAG DIAGRAM BAND ELIMINATION UNIT
TYPE I
Inventor
ELLISON S. PURINGTON.
By
Attorney

United States Patent Office 2,762,018
Patented Sept. 4, 1956

2,762,018

REACTANCE NETWORKS WITH STRUCTURAL SYMMETRY

Ellison S. Purington, Gloucester, Mass., assignor to John Hays Hammond, Jr., Gloucester, Mass.

Application October 9, 1950, Serial No. 189,205

1 Claim. (Cl. 333—75)

This invention relates to reactance networks with structural symmetry and to their insertion loss and lag performances with respect to equal terminations which are resistances of a value independent of frequency.

One of the objects of this invention is to provide an improved method of determining the performance of such networks, so terminated, making use of a graphical aid in the form of a chart.

Another object is the application of this method in the determination of the insertion loss complementary of any given symmetrical reactance structure, such as the determination of band elimination units related to simple band pass units.

This invention can be further extended to be applicable to many reactance networks with electrical symmetry which are not structurally symmetrical, such as composite waves filters made up of an integral number of differently constructed sections suitably related, each possessing structural symmetry. This extension is set forth in my copending application Serial No. 189,206, filed October 9, 1950.

The invention also consists in certain new and original features of construction and combinations of parts hereinafter set forth and claimed.

The value of the invention as to its objects and advantages, the mode of its operation and the manner of its organization, may be better understood by referring to the following description, taken in connection with the accompanying drawings forming a part thereof in which, Fig. 1 is a schematic diagram illustrating the meanings of certain terminologies used in the development of the invention;

Fig. 2 is a schematic diagram illustrating certain mathematical functions used in the development of the invention;

Fig. 3 is a chart illustrating the structures of networks basically useful for low- and high-pass purposes;

Fig. 6 is a chart showing the structures of networks basically useful for band pass purposes;

Fig. 8 is a chart showing the structures of networks in accordance with this invention, useful as band elimination wave filter units related to the band pass structures of Fig. 6;

Fig. 9 is a chart in accordance with this invention illustrating the performance of a network of Fig. 8, and Fig. 10 is a schematic diagram showing a mutual inductance type band elimination wave filter unit.

Like reference characters denote like parts in the several figures of the drawings.

In the following description parts will be identified by specific names for convenience, but they are intended to be generic in their application to similar parts.

Figure 4:
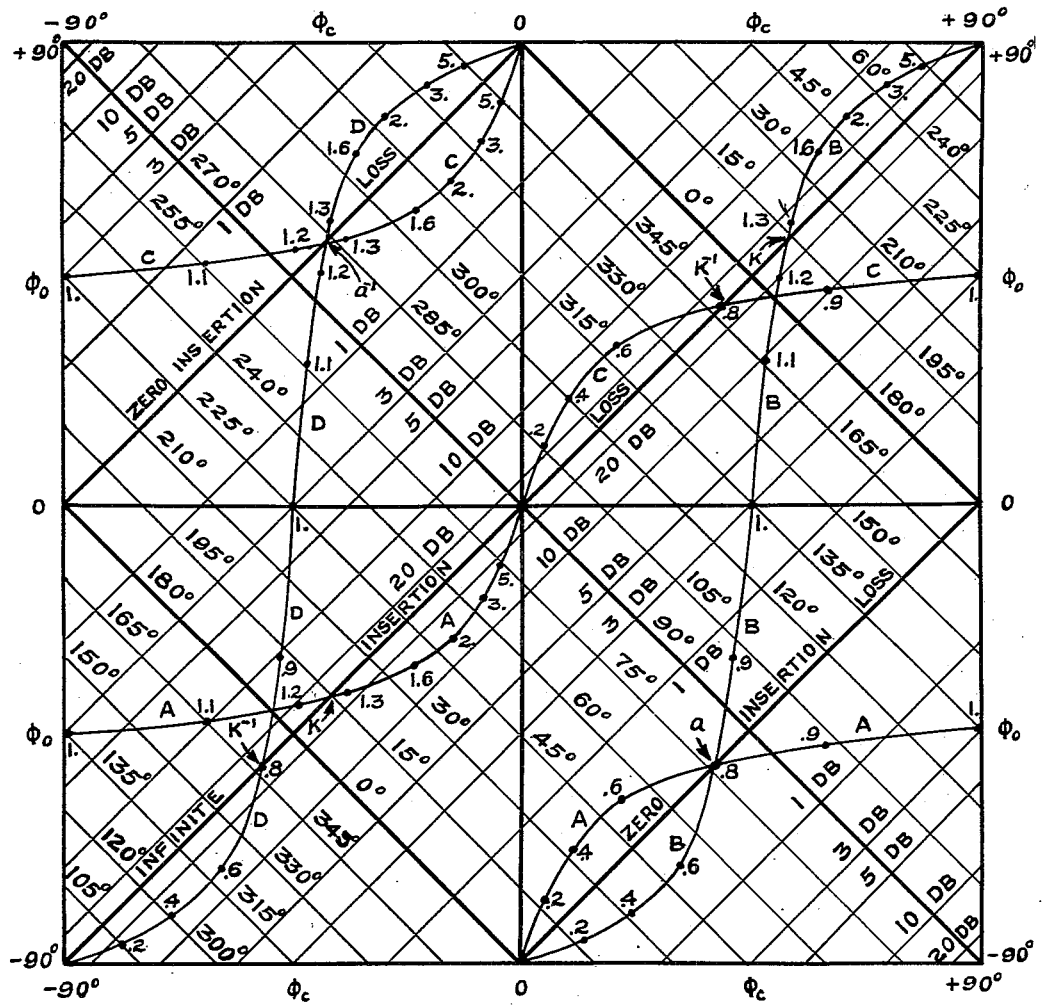
Fig. 4 is a chart in accordance with the invention determining the performance of networks of Fig. 3.

A four terminal impedance with two sets of terminals, 1, 2 and 3, 4 is electrically symmetrical if it is irrelevant as regards external effects as to which set of terminals is chosen to be connected to the power source, leaving the other set to be connected to the receiving load. In this category, for example, are all the reactance networks for wave filter purposes recorded by F. E. Terman, Proc. IRE, June 1943, pages 290–291. Included also are Campbell-Zobel composites made up of an integral number of matched units. Customarily all these networks are describable by two complex functions of frequency. These are the iterative impedance here designated $Z_I$, and the propagation constant, here designated $\gamma$, which describes also the performance of the network under the conditions of iterative terminations.

Whenever the network is castable into bisectable form, it is also describable by two impedance functions of frequency which are totally independent of the possible terminations. These are designated $Z_o$ and $Z_c$, the impedances looking into the network opened and closed, respectively, at the center of symmetry. In the copending application Serial No. 189,206, this concept is extended to cover composites with electrical symmetry, which are not bisectable, whereby the principles of the present invention are further extended.

The relations between the two sets of parameters $Z_I$ and $\gamma$ of line parameter theory on the one hand, and $Z_o$ and $Z_c$ herein used on the other hand, are readily derivable from K. S. Johnson, Transmission Circuits for Telephonic communication, third printing (1927), Fig. 14 of page 134, and are:

$$Z_o = Z_I \coth \gamma/2 \qquad (1)$$

$$Z_c = Z_I \tanh \gamma/2 \qquad (2)$$

and $$Z_I = \sqrt{Z_o Z_c} \qquad (3)$$

$$\gamma = \log_e \frac{\sqrt{Z_o} + \sqrt{Z_c}}{\sqrt{Z_o} - \sqrt{Z_c}} \qquad (4)$$

Regardless of the mode of expressing the nature of the network, it performance is expressed in terms of the effects due to the inclusion of the network between desired terminations, explained with reference to Fig. 1. If the network is absent, Fig. 1A, and a sending arm of impedance $Z$ with a driving force $E$ is direct connected to a load arm also of impedance $Z$, there will be a reference current $I_r'$ in the load receiving arm of value $I_r' = E/2Z$. The load upon the sending arm in this case is the impedance $Z$ of the receiving arm. When, however, a network is inserted between the terminations, as in Fig. 1B, the current in the receiving arm becomes the actual current $I_r$, usually smaller than the reference current $I_r'$ and of different phase. The current in the sending arm is designated $I_s$, while the load upon the sending arm is the impedance $Z_n$ looking into the network loaded by the receiving arm $Z$. This impedance is $Z_n = (E/I_s) - Z$.

Insertion loss relates to the decibel diminution of the magnitude of the current in the receiving arm due to the presence of the network; insertion phase lag relates to the increase of the phase lag of the current in the receiving arm due to the presence of the network. These insertion effects can be computed only after a determination of the vector ratio of the reference current $I_r'$ to the actual current $I_r$. This ratio is here termed the Insertion Ratio, and is $$\text{Insertion ratio} = \frac{I_r'}{I_r} = \frac{E/2Z}{I_r} = (M + jN) \qquad (5)$$

where M and N are real functions of frequency, determinable for any specific circuit configuration. From the functional forms of M and N, or by tabular information as to their values at different frequencies, the loss and lag performance of the network with respect to the terminations is given by:

$$\text{Insertion loss, db} = 10 \log_{10}(M^2 + N^2) \quad (6)$$

$$\text{Insertion phase lag} = \tan^{-1}(N/M) \quad (7)$$

Whenever it is desired to express the insertion effect as regards the sending arm, this can be the loading ratio, defined by the ratio of the load $Z_n$ upon the sending arm with the network present to the load $Z$ upon that arm with the network absent and the sending and receiving arms direct connected. That is:

$$\text{Loading ratio} = \frac{Z_n}{Z} \quad (8)$$

These basic definitions and working equations are independent of the manner in which the network is described, and for the situations of the present discussion are believed to be consistent with the intent of the originators of the insertion concept. The brief review is necessitated because of confusion and errors in what might be considered reliable references.

By making use of U. S. Patent 1,601,109 to E. L. Chaffee (claim 1) plus the principle of superposition, using a procedure I have set forth in Proc. IRE, June 1930, pages 996–998, I have provided a short cut theorem recorded in Proc. IRE, May 1941, p. 282, for evaluating $I_s$ and $I_r$ of Fig. 1B whenever the circuit is bisectable. It was applied by me in the development of a network theory with $Z_o$ and $Z_c$ as parameters, as partially set forth in Electronics: November 1942; January 1943; June 1943; September 1943. It was found that when the complete circuit of Fig. 1B is describable by three impedances, namely $Z_o$ and $Z_c$ pertaining to the network and $Z$ pertaining to the terminations, then the insertion and the loading ratios covered in general by Equations 5 and 8 become:

$$\text{Insertion ratio} = \frac{I_r'}{I_r} = \frac{(Z+Z_o)(Z+Z_c)}{Z(Z_o-Z_c)} = M + jN \quad (9)$$

$$\text{Loading ratio} = \frac{Z_n}{Z} = \frac{(Z_oZ_c)/Z^2 + (Z_o+Z_c)/2Z}{1+(Z_o+Z_c)/2Z} \quad (10)$$

These equations together with Equations 6 and 7 above, cover the complete insertion effects theory of symmetrical bisectable networks with equal terminations. From these equations, the following deductions can be made, relating to conditions under which the insertion loss, Equations 6 has special values of zero and infinite insertion loss.

1. The loading ratio is unity for any frequency making $Z_oZ_c=Z^2$, whereby the power flow from the sending arm is the same for the network absent as in Fig. 1A as for the network present as in Fig. 1B. If the network elements are themselves non-dissipative, all the power delivered to the network $Z_n$ in the steady state is also being delivered to the load $Z$, and the insertion loss is zero.

2. The loading ratio is also unity for any frequency making $Z_c=0$ and $Z_o=$infinity, regardless of whether $Z_oZ_c=Z^2$ as this condition is approached. The insertion loss is zero and the insertion lag is zero, since the insertion ratio has a value $+1$.

3. The loading ratio is also unity for any frequency making $Z_o=0$ and $Z_c=$infinity, regardless of whether or not $Z_oZ_c=Z^2$ as this condition is approached. However, the insertion ratio is $-1$, wherefore the insertion loss is zero but the insertion lag is 180° corresponding to a phase reversal.

4. The insertion ratio and therefore the insertion loss is infinite for any frequency making $Z_o$ and $Z_c$ equal.

5. The insertion ratio and therefore the insertion loss is infinite for any frequency making $Z_o$ and $Z_c$ infinite, regardless of equality as this condition is approached.

The equational theory here presented is compatible with the prior theory of insertion performance on the line parameter basis. Thus when the circuit of Fig. 1B is described in the classical manner by parameters $Z_I$ and $\gamma$ relating to the network and $Z$ relating to the terminations, then by K. S. Johnson, loc. cit., page 141, Equation 63, the insertion ratio is clearly:

$$\text{Insertion ratio} = \frac{I_r'}{I_r} = [e^\gamma] \left[ \frac{(Z_I+Z)^2}{4Z_IZ} \right] \left[ 1 - \left(\frac{Z_I-Z}{Z_I+Z}\right)^2 \times e^{-2\gamma} \right] \quad (11)$$

where $e$ is the Naperian base. For those familiar with the flow of pulses along a smooth transmission line, the following is a physical explanation of the equation. The first factor is the insertion ratio pertaining if the network were terminated by its iterative impedances on both ends; the second factor is a mismatch or reflection correction due to the actual terminations being different from the iterative terminations used as a reference, the correction at each end being made however on the assumption that the other end nevertheless is iteratively terminated; the third is an overall interaction correction necessitated because the assumptions made in setting up the second correction factor were contrary to fact.

If, however, a physical interpretation is not of importance, the three factors could be multiplied together and using hyperbolic abbreviations for exponential functions:

$$\text{Insertion ratio} = [\cosh \gamma] + \left[ \tfrac{1}{2}\left(\frac{Z}{Z_I} + \frac{Z_I}{Z}\right) \times \sinh \gamma \right] \quad (12)$$

Now for networks which are bisectable, as in the present application, the simplest procedure for evaluating the line parameters $Z_I$ and $\gamma$ is by first determining the impedance functions $Z_o$ and $Z_c$ and then applying Equations 3 and 4. But by substituting $Z_I$ and $\gamma$ as given by those equations in either of Equations 11 and 12, the insertion ratio of line theory becomes simply the insertion ratio of the present theory given by Equation 9.

Obviously it is highly inefficient to make use of line parameter methods in determining the performance of any circuit which can be less circuitously examined by the methods expressed by Equations 9 and 10.

One of the most important types of networks are those made up of inductors and capacitors in structurally symmetrical form, useful for filtering and for phase shifting purposes. Fundamentally, information is desired as to how they behave with respect to terminations which are equal resistance impedances not a function of frequency. For this case, the general theory of Equations 5 to 8 simplifies since $Z$ is a pure resistance and $Z_o$ and $Z_c$ are pure reactance impedances, as illustrated in Fig. 2. When cast into bisectable form and center-opened, as in Fig. 2A, the active circuit comprises source E operating through sending termination R into an impedance $jX_o$, where R is the terminating resistance and $X_o$ is a two-terminal reactance function of frequency. The ratio $X_o/R$ determines a generalized quality factor $q_o$ analogous to the Q factor of an inductor, capacitor or tuned circuit. The phase angle by which the driving voltage leads the resulting current $I_o$ in the circuit is $\phi_o$, which is the antitangent of the quality factor. Similarly in Fig. 2B, when the circuit is center-closed, the sending arm operates into an impedance $jX_c$, where $X_c$ is another two-terminal reactance function of frequency. The ratio $X_c/R$ similarly defines a quality factor $q_c$ which is the tangent of the corresponding phase angle $\phi_c$. It will be understood that the quality factors are positive when the reactance is inductive, and negative when capacitive, and that the phase angles can range between −90° and +90° in value. Two terminal reactance impedances have been extensively studied by Foster, and their properties are well known and set forth in most texts. The functions $q_o$ and $q_c$ can have mathematical forms precisely the same in nature as two terminal reactances.

The insertion ratio Equation 9 is expressible in terms of two ratios $Z_o/Z$ and $Z_c/Z$ which for reactance networks with resistance terminations are $jq_o$ and $jq_c$ respectively. The resulting insertion ratio equation and the corresponding loss and lag equations become:

$$\text{Insertion ratio} = \left[\frac{q_o+q_c}{q_o-q_c}\right] + j\left[\frac{q_oq_c-1}{q_o-q_c}\right] = M + jN \quad (13)$$

$$\text{Insertion loss, db} = 10 \log_{10}[1+F_{\text{loss}}^2]; \quad F_{\text{loss}} = \left[\frac{1+q_oq_c}{q_o+q_c}\right] \quad (14)$$

$$\text{Insertion phase lag} = \tan^{-1}(F_{\text{lag}}); \quad F_{\text{lag}} = \left[\frac{q_oq_c-1}{q_o+q_c}\right] \quad (15)$$

Upon substituting $\tan \phi_o$ and $\tan \phi_c$ for $q_o$ and $q_c$ in Equations 14 and 15, and reducing by trigonometric manipulations, $$\text{Insertion loss, db} = 10 \log_{10} \csc^2(\phi_o - \phi_c) \quad (16)$$

$$\text{Insertion phase lag} = (\phi_o + \phi_c) \pm 90° \pm (n \times 360°) \quad (17)$$

Thus equations of more explicit nature become available for computing the loss and lag effects, either in equational form by use of Equations 14 and 15, or in tabular form using Equations 16 and 17. Ambiguities as to the insertion lag value can be resolved in part by examination of the quadrant location of the insertion ratio vector. Thus knowledge is required as to the senses of three functions, $(q_o+q_c)$, $(q_o-q_c)$ and $(q_oq_c-1)$, in order to determine the senses of M and N. The value of the insertion lag can be properly established in the range 0° to 360°, but to this value can be added any integral multiple $(n \times 360°)$ of a complete revolution of the insertion ratio vector in accordance with any physically justifiable convention.

In Fig. 3 are given the structures for which one of $Z_o$ and $Z_c$ is a two terminal two element reactance impedance comprising an inductor and a capacitor in parallel or in series, while the other of $Z_o$ and $Z_c$ is a two terminal single element impedance involving an inductor or a capacitor. These combinations are useful of low-and high-pass wave filtering purposes. Those involving the "trap" parameter $k$ ranging variably between limits 1 and infinity, exclusive, are the impedance level complementary low-pass units $A_k$ and $B_k$, and their frequency complementaries $C_k$ and $D_k$ which are impedance level complementaries useful for high-pass purposes. The units involving the "coupling" parameter $\tau$ ranging from $-1$ to $+1$ are designated $B\tau$ and $C\tau$ and are more general than their related $k$ designated units. When the variable $k$ approaches unit, or $\tau$ approaches $-1$, the unit varied vanishes to nothingness to leave the sending arm direct connected to the receiving arm with zero loss and lag for all frequencies. When the variable $k$ approaches a fixed value infinity or $\tau$ approaches the fixed value zero, the corresponding unit simplifies to become a "constant-K."

Universally, L and C are of numerical impedance $hR$ at F, where $h$ is an impedance level factor, R is the resistance of the terminations with which a unit is to be used, and F is the resonant frequency of the two element impedance $Z_o$ or $Z_c$, and usually designated the cutoff frequency. The trap parameter $k$ expresses the numerical ratio, universally greater than unity, between the frequency of a trap circuit, $kF$ or $k^{-1}F$, and the reference frequency F. The main independent variable $x$ is an abbreviation for the ratio of any frequency $f$ to the reference frequency F, given by $x = f/F$.

Thus, mathematically, there are four parameters R, F, $h$ and $k$ which can describe the entire circuit for any specified type, and these suffice by equations given, to determine the four different circuit elements such as R, $mC$, $nC$ and $pL$ for the $A_k$ type, which make up the complete physical circuit. Broad specifications R and F enter into the determination of the values L and C in such a manner that the insertion performances as functions of the frequency ratio $x$ are functions only of the parameters $h$ and $k$. It will be understood that if the circuit elements were arbitrarily chosen, then the corresponding parameter values R, F, $h$ and $k$ could be computed, but the networks might not have good filtering properties. By performance curves labeled in accordance with $h$ and $k$ parameters, a stockpile of designs could be built up for use in meeting requirements within the capabilities of the units recorded.

Formulas for the $q_o$ and $q_c$ functions for these units are recorded, in terms of parameters $h$, and $k$ and the ratio $x$. The function $m = \sqrt{1-k^{-2}}$ is used as an abbreviation, and corresponds to one of the factors applied to L or C to determine network values. Physically it is an indication of the position of the trap parameter with respect to the lower limit $k=1$ and the upper limit $k=\infty$, being of zero value in the former case and unity in the latter. These $q$ functions can be utilized to develop explicit equations for loss and lag performance by generic Formulas 13 to 15. Or from them by tabular methods, the corresponding phase angle functions $\phi_o$ and $\phi_c$ can be computed for determining the loss and lag by Equations 16 and 17.

In the $B\tau$ and $C\tau$ representations, the coefficient of coupling is here considered positive if the overall inductance of two inductors in series is greater than the sum of the inductances of the constituent inductors. This is in accord with elementary concepts. The $B_k$ unit is equivalent to the $B\tau$ unit provided $k$ and $\tau$ are related by the equations given. The $\tau$ designated units must be used if units are desired with $m$ values in the $q$ equations in the range $1 < m < \infty$, were $k$ is a pure imaginary and a $k$ designated unit is not physically realizable. Therefore the $\tau$ designated units are more general and provide loss and lag performance curves not achievable by the $k$ designated units. Usually $m$ values less than unity, permitting either $k$ or $\tau$ designated units, are used when loss performance is the main consideration. M values greater than unity are used for special purposes. Thus the $B\tau$ type unit, corresponding to the Type III units of G. W. Pierce, Electric Oscillations and Electric Waves, 1920, page 299, Fig. 4, is used with suitable values of $m$ greater than unity in the construction of artificial delay lines for equal time lag for a wide band of frequencies.

The insertion performance of any complete circuit described $q_o$ and $q_c$ functions can be derived by use of a simple generic chart in which $\phi_o = \tan^{-1} q_o$ and $$\phi_c = \tan^{-1} q_c$$

are ordinates and abscissas, as in Fig. 4. On the $\phi_o$ vs $\phi_c$ plane ranging from $-90°$ to $+90°$ are contour lines of equal loss and of equal lag, established by the relations of Equations 16 and 17 respectively. These are straight lines sloping diagonally. The lag lines are evenly spaced, and their construction and markings can be readily duplicated without special instructions. For the loss lines, the main zero and infinite insertion loss lines are also readily constructable. For construction of the other loss lines, the following information is useful. Starting with any point on a zero loss line, the distance of travel at constant $\phi_o$ or at constant $\phi_c$ in either direction horizontally or vertically to a point where the loss is a specified value is as follows:

| Db loss: | Distance, degrees |
|---|---|
| 0.0 | 0.0 |
| 0.5 | 19.2 |
| 1.0 | 27.0 |
| 3.0 | 44.9 |
| 5.0 | 55.8 |
| 10.0 | 71.57 |
| 15.0 | 79.76 |
| 20.0 | 84.26 |
| 30.0 | 88.19 |
| 40.0 | 89.42 |

On the background of these straight lines generically useful for any circuit describable by $\phi_o$ and $\phi_c$ functions of frequency, may be placed a dot indicating the $\phi_o$ and $\phi_c$ values for any specific circuit for each desired value of the frequency ratio $x$. In this Fig. 4 are the traces marked A, B, C and D corresponding to the loci of the $x$ points of values indicated, for the four $k$ type units of Fig. 3, and for the indicated values of the parameters $h$ and $k$. Thus for the A unit, the indication for any value of $x$ is placed at a point where the ordinate and abscissa are $$\phi_o = \tan^{-1}\left[\frac{-1}{x}\right] \quad (18)$$

$$\phi_c = \tan^{-1}\left[-\frac{.36x}{x^2-1}\right] \quad (19)$$

Consider, for example, the trace A, starting with the value $x=0$ for which $\phi_o=\alpha$, $\phi_o \phi_c=0$ making the loss and lag zero due to $Z_c$ being zero and $Z_o$ infinite. With increasing $x$, the loss climbs to a peak of about .6 db at about $x=.5$, then returns to zero loss at $x=0.8$ for which $Z_oZ_c=Z^2$. With further increase, the trace becomes discontinuous without change of loss or lag at the technical cutoff, $x=1.0$ and the loss is $3db$. Thence the loss increases rapidly to infinite value at $x=1.25$ corresponding to $Z_o=Z_c$. During the increase of $x$ up to this point, the lag has increased from zero to 195°. As $x$ increases through this point where $I_r$ passes through zero, there is a phase shift by 180° justifiably interpreted as a reduction of phase lag. Thereupon the loss decreases to a minimum of about 13 db at $x=2$ and then increases to infinity at $x=$ infinity, corresponding to a condition $Z_o=Z_c=0$.

The loss and lag for the A and B traces are identical for like $x$ values, and similarly for the C and D traces. This is because the A and C units are impedance level complementaries of the B and D units respectively. The A and C traces, and likewise the B and D show identical loss values for reciprocally related values of $x$, due to the frequency complementary relationship. Other relations will be discussed subsequently.

In this example of the use of the loss and lag chart, the emphasis is upon loss performance. For other networks, the emphasis is upon lag performance, and loss is not desired. Phase compensation without insertion loss can be attained by reactance networks with resistance terminations for which $q_oq_c=-1$ over the entire frequency range. This makes the loss zero due to the relation $Z_oZ_c=Z^2$ for all frequencies. The insertion lag, by Equation 15 is $\tan^{-1}[-2/(q_o+q_c)]$.

Another type of network with emphasis on lag performance is the multiple section low pass filter or artificial line designed to make the lag proportional to frequency up to the highest required frequency, but with low or uniform loss. These characteristics are desired for equal resistance terminations and use is made of reactance networks. A line made up of an even number of like $B_r$ units of Fig. 3 is bisectable and the $q$ functions for a six section line, for example, are:

$$q_o^{vi} = \frac{h}{6m} \cdot \frac{X_{a2} \cdot X_{a4} \cdot X_{a6}}{x \cdot X_{a3} \cdot X_{a5}} \quad (20)$$

$$q_c^{vi} = 6hmx \cdot \frac{X_1 \cdot X_{a3} \cdot X_{a5}}{X_{a2} \cdot X_{a4} \cdot X_{a6}} \quad (21)$$

where $X_n=(x/n)^2-1$ and therefore $X_1=x^2-1$, and where $h$ is the impedance level, $m$ the representative of $k$ or $r$ and $$a_2 = \sqrt{\frac{1+(7-\sqrt{48})m^2}{1+14m^2+m^4}}; \quad a_4 = \sqrt{\frac{1}{1+m^2}}$$

$$a_6 = \sqrt{\frac{1+(7+\sqrt{48})m^2}{1+14m^2+m^4}}; \quad a_3 = \sqrt{\frac{1}{1+3m^2}}$$

$$a_5 = \sqrt{\frac{1}{1+(m^2/3)}}$$

Figure 5:
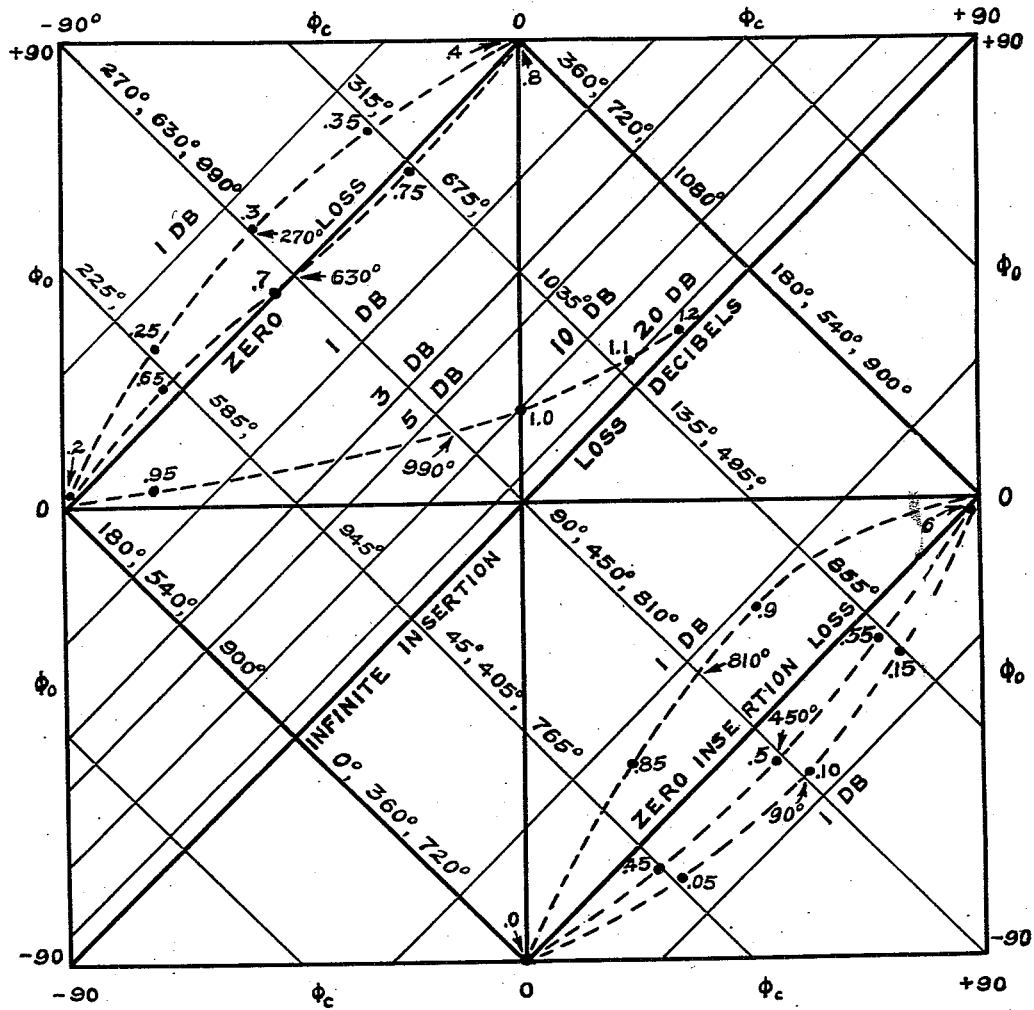
Fig. 5 is a chart in accordance with this invention illustrating the performance of a recurrent chain of one type of network shown in Fig. 4.

Fig. 5 gives the loss and lag diagram in accordance with the methods of this invention, for a six unit chain of B low pass units, with the parameters $h=1.4$, $r=.27$ ($m=1.32$).

Physically justifiable conventions are that the lag is zero for zero frequency, and that the lag function cannot be discontinuous when the trace passes through a point of zero loss. The lag therefore increases from zero at $x=0$, to 720° at $x=a_5$ which is very closely 0.8; and over this range the lag is very closely proportional to frequency and the loss is less than 1 db. In this chart, all three conditions for zero loss are present. Thus at $x=.7$ the loss is zero due to the choice of parameter $h$, with $Z_oZ_c=Z^2$. At $x=0$, $a_3$ and $a_5$ the loss is zero due to $Z_c=0$, $Z_o=$ infinity, while at $x=a_2$, $a_4$ and $a_6$ it is zero due to $Z_o=0$ and $Z_c=$ infinity.

By Figs. 4 and 5, the usefulness of the chart in a method of evaluating loss and lag performance is established. It is useful in other manners, as pointing the way to the developing of new and useful structural forms. Referring back to Fig. 4, it will be observed that the trace for the $A_k$ unit is spaced from that for the $C_k$ unit by 90 electrical degrees. As a consequence, whenever the loss is zero on one trace for a special value of $x$, it is infinite on the other trace for that same value of $x$. This relation does not always hold between a given unit and its frequency reciprocal, but does exist between the $A_k$ and its $C_k$ frequency reciprocal of Fig. 3, provided as in the present case $k\sqrt{1-h^2}=1$. Similarly it holds for the $B_k$ and $D_k$ units provided $k\sqrt{1-h^{-2}}=1$. In addition to being frequency complementaries, the specific $A_k$ and $C_k$ units used in Fig. 4 may be termed insertion loss complementaries, since for any frequency making the loss zero for one, the loss will be infinite for the other, and vice versa.

Analytically the relations between insertion loss complementaries can be found by examining Eq. 16. It is required that $(\phi_o-\phi_c)$ for one unit differ from $(\phi_o-\phi_c)$ for the other unit, at all values of $x$, by 90°. Less generally, with reference to Equation 14, suppose there is available a first circuit specified by $q_{o1}$ and $q_{c1}$ as functions of frequency. The loss function for this unit is $$F_{loss,1} = \left[\frac{1+q_{o1}q_{c1}}{q_{o1}-q_{c1}}\right] \quad (22)$$

Now suppose a second circuit can be devised, specified by $q_{o2}$ and $q_{c2}$, for which $q_{o2}$ for the second circuit is identical with $q_{c1}$ for the first, while $q_{c2}$ for the second is the negative reciprocal of $q_{o1}$ for the first. That is $$q_{o2} = q_{c1} \quad (23)$$

$$q_{c2} = -1/q_{o1} \quad (24)$$

Because of this relationship, the loss function for the second unit becomes:

$$F_{loss,2} = \left[\frac{1+q_{o2}q_{c2}}{q_{o2}-q_{c2}}\right] = \left[\frac{q_{o1}-q_{c1}}{1+q_{o1}q_{c1}}\right] = \frac{1}{F_{loss,1}} \quad (25)$$

That is, the loss functions for the first and second units are reciprocals. Accordingly the loss for the first unit will be high for any frequency ratio $x$ for which the loss for the second unit is low, and vice versa. The crossover point is at loss value 3 db. for which the two loss functions are both unity.

More generally, a requirement that two units be insertion loss complementaries is that one of $q_o$ and $q_c$ for the second unit be identical with one of $q_o$ and $q_c$ for the first, while the $q$ functions of the two units which are not identical must be negative reciprocals.

These principles may be applied to the determination of band elimination structures corresponding to any band pass structure, in a manner more general than set forth in available references.

The standard band pass units of basic nature, together with information for choosing constants and the generic formulas for $q_o$ and $q_c$ functions for evaluating their loss and lag performance, are given in Fig. 6. These are the most general networks for which $Z_o$ and $Z_c$ are both simple parallel resonant circuits, or are both simple series resonant circuits. For any selected type, one of $Z_o$ and $Z_c$ resonates at a frequency $x_1 F$, while the other resonates at a higher frequency $x_2 F$, where F is a reference frequency, $x_1 x_2$ is unity, and the resonant frequencies correspond to cutoff frequencies of conventional theory. The difference $d=(x_2-x_1)$ is a new parameter indicating the band width properties of the unit, which taken with parameters R, F, $h$ and $k$ with meanings similar to parameters in Fig. 3 makes a total of five parameters which uniquely determine the five independent elements of a complete circuit. These units perform similarly to the similarly designated units of Fig. 3, but provide for infinite loss at both zero and infinite frequencies. They further provide for two frequencies of zero loss due to the relation $Z_o Z_c = Z^2$.

Figure 7:
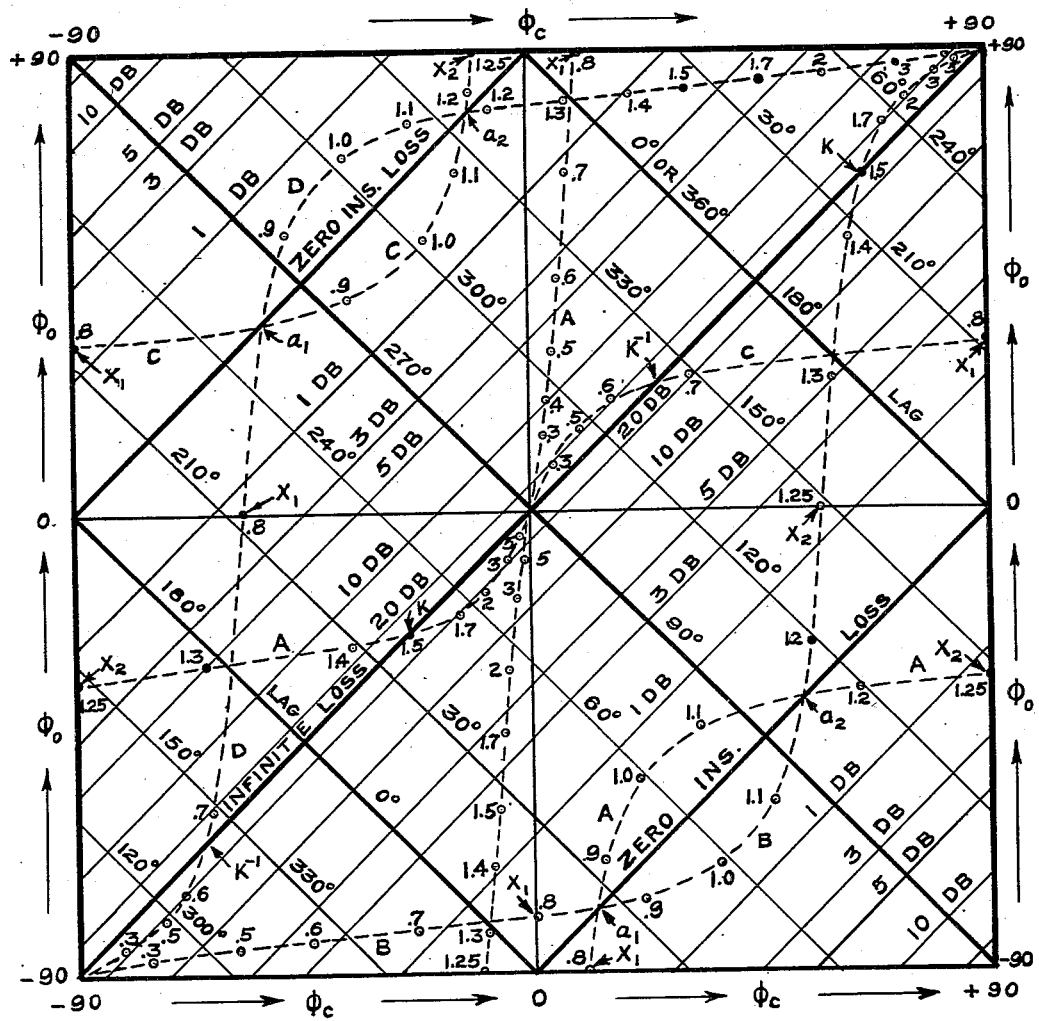
Fig. 7 is a chart in accordance with this invention illustrating the performance of networks of Fig. 6.

Examples of the loss and lag performance of units of Fig. 6 are shown in Fig. 7, for the indicated choice of the parameters $h$, $k$ and $d$ which determine the performance as a function of the frequency ratio $x$.

Consider for example the trace for the A type unit. This provides infinite loss at $x=0$, $x=1.5$ and $x=$infinity, and provides zero loss at $x=.86$ and $x=1.16$. The exact insertion loss complementary would have infinite loss at $x=.86$ and $x=1.16$ and zero loss at $x=0$, $x=1.5$ and $x=$infinity. Instead of first designing a band pass unit and then deriving an insertion loss complementary to serve as a band elimination unit, it appears preferable to develop the band elimination unit in completely general terms.

Type A and C band pass units are broadly characterized by $Z_o$ and $Z_c$ representing parallel resonant circuits tuned to different frequencies. Type B and D are broadly characterized by $Z_o$ and $Z_c$ representing series resonant circuits tuned to different frequencies. Now it is well known that a parallel and a series resonant circuit are potential impedance reciprocals. Starting with A or C type band pass units, it follows that the insertion loss complementary will be a network unit for which one of $Z_o$ and $Z_c$ represents a parallel resonant circuit tuned to one frequency and the other a series resonant circuit tuned to a different frequency. The same conclusions will be reached upon starting with a B or D type band pass unit.

Therefore to derive the basic band elimination units related to the basic band pass units of Fig. 6, it is merely necessary to put together the most general symmetrical structures for which one of $Z_o$ and $Z_c$, the impedances looking into the structure opened and closed at the center, corresponds to an inductor and capacitor in series, and the other corresponds to an inductor and a capacitor in parallel.

Units developed in this manner are set forth in Fig. 8, together with formulas for determining network elements corresponding to five parameters R, F, $h$, $k$ and $d$, all defined similar to like designated parameters for band pass units. Two types are recorded, namely the two for which $Z_c$ represents a parallel tuned circuit and $Z_o$ a series tuned circuit. It does not appear practicable to develope bisectable units for which $Z_o$ represents a parallel tuned circuit and $Z_c$ a series tuned circuit. However it will be found that either of the two types shown suffices to furnish exact insertion loss complementaries to all the four band pass units of Fig. 6.

For completeness, the loss functions for the two types are recorded, in addition to the $q_o$ and $q_c$ functions for use in graphical solutions. It is clear that designation of a $k$ value for these units establishes infinite loss at two points, namely $x=k$ and $x=k^{-1}$, in the loss range $x_1 < x < x_2$. These are points of infinite loss which can be identical with the points $a_1$ and $a_2$ for zero loss in the insertion loss complementary band pass units. One point of zero loss for the point $a$ for the Type I unit, and for the point $b$ for the Type II unit, is provided. Each of these can be placed in the low loss range $0 < x < x_1$ or in the loss range $x_2 < x < \alpha$, through suitable choice of the impedance level parameter $h$. This point of zero loss can be made identical with a point $k$ or $k^{-1}$ for the complementary band pass unit.

The loss and lag diagram for a Type I unit with specified parameters $d=.45$, $k=1.12$ and with three different $h$ values, .5, 1.0 and 2, is shown in Fig. 9. The zero loss point $a$ is in the lower frequency low loss range provided $h < x_1$ as exemplified by the curve for $h=0.5$. It is in the higher frequency low loss range provided $x_2 < h$, as exemplified by $h=2.0$. If however, $h$ is chosen in the range $x_1 < h < x_2$, then the point $a$ of zero loss becomes an imaginary, and is therefore non-existent, as exemplified by the curve for $h=1.0$. Thus the choice of the parameter $h$, suitably made with respect to the values $x_1$ and $x_2$ determines whether the Type I unit is the insertion loss complementary of the Type A and B band pass units, or the Type C and D band pass units.

The Type II unit, by structural inspection, is the frequency complementary of the Type I unit, and also can be the insertion loss complementary of any of the four basic band pass units.

These units are highly efficient as measured by the number of elements required to produce a given number of infinite and zero loss points. With reference to T. E. Shea, "Transmission Networks and Wave Filters," 1929, the full sections of band elimination units which can be made up of the half sections of Fig. 182, page 335, have six and eight elements, with five and seven total points, respectively, of zero and infinite insertion loss, with a suitable value for the parameter. That is, the available types therein recorded provide one less point of zero and infinite loss than there are elements, just as is the case with the basic band pass units of Fig. 6. However, the five element Type I and II units of Fig. 8 provide exactly as many total points of zero and infinite loss as there are elements. Moreover, if the Type II unit has the three inductors replaced by two inductors with negative mutual as shown in Fig. 10, a band elimination unit is provided with one more point of infinite and zero loss than the number of elements. These new units herein disclosed, will be found to be useful where performance of the conventional six or eight element band elimination units is slightly better than required.

It is clear that this invention relates to a new method of evaluating insertion loss based upon the preparation and use of a chart generically of value in the determination of the performance possibilities of any structurally symmetrical reactance network, when terminated with equal resistances. The chart is based upon the use of $\phi_o$ and $\phi_c$ functions which broadly described the complete circuit. The loss and lag contour lines are simple straight lines, easy to construct, and the ordinates and abscissas vary between definite finite limits. Special charts can be developed, of course, if there is especial interest in very high loss values, where the $\phi_o$ and $\phi_c$ values differ very slightly. More ornamental charts using $q_o$ and $q_c$ as ordinates and abscissas can be developed to simplify the location of the $x$ points, but with the disadvantages that the contour lines are curved to complicate interpolation, and the abscissas and ordinates must run to infinite values.

This chart has indicated the manner in which the insection loss complementary of any developed network can be determined, and this is exemplified by the development of band elimination units related to the basic band pass units. It is also possible to develop the band elimination units which are insertion loss complementaries of other band pass units, such as those of seven elements. Those here recorded however are of special interest due to their superior efficiency as measured by the number of total points of zero and infinite insertion loss which they provide.

Although only a few of the various forms in which this invention may be embodied have been shown herein it is to be understood that the invention is not limited to any specific construction but might be embodied in various forms without departing from the spirit of the invention or the scope of the appended claim.

What is claimed is:

A five element structurally symmetrical bridged T band elimination wave filter unit, Type I: with capacitor series arms of value $uC$, with an inductor mid-shunt arm of value $nL/2$, with a bridging arm comprising an inductor of value $2mL$ in parallel with a capacitor of value $vC/2$; said L and C being an inductance value and a capacitance value both of numerical impedance $hR$ at F, where $h$ is a numeric freely choosable positively between a lower limit zero and an upper limit infinity, R is the resistance value of the resistance terminations with which the unit is to be used, F is the geometric mean of a lower "cutoff" frequency $F_1$ and a higher "cutoff" frequency $F_2$, said factors $m, n, u, v$ which together with the L and C values determine the network structural constants being related to the band width parameters $x_1 = F_1$ and $x_2 = F_2/F$ and to the trap parameter $k$ freely choosable between a lower limit unity and an upper limit $x_2$ by the relations, $$m = \sqrt{\frac{(k^2 - x_1^2)(x_2^2 - k^2)}{k^2 x_1^2}}$$

$$n = \frac{1}{m}; \quad u = mx_1^2; \quad v = \left[\frac{1}{u} - u\right]$$

said unit being a most general form for which one of the impedances $Z_o$ and $Z_c$ looking into the network opened and closed respectively at the center of symmetry represents an inductor and a capacitor in series and tuned to one frequency, and the other represents an inductor and a capacitor in parallel and tuned to another frequency; said unit thus constructed providing especially high insertion loss with respect to its R terminations for frequencies between $F_1$ and $F_2$ and especially at $kF$ and at $F/k$, and providing low insertion loss for all other frequencies, especially for very low and very high frequencies and for a frequency $$x_2 F \sqrt{\frac{h^2 - x_1^2}{h^2 - x_2^2}}$$

capable of being located either at a frequency below $x_1 F$ or above $x_2 F$ in accordance with a suitable numerical choice of the parameter $h$.

References Cited in the file of this patent

UNITED STATES PATENTS

| | | |
|---|---|---|
| 1,611,932 | Mathes | Dec. 28, 1926 |
| 1,644,004 | Zobel | Oct. 4, 1927 |
| 1,770,422 | Nyquist | July 15, 1930 |
| 2,029,698 | Bode | Feb. 4, 1936 |
| 2,177,761 | Wheeler | Oct. 31, 1939 |

FOREIGN PATENTS

| | | |
|---|---|---|
| 706,006 | France | Mar. 23, 1931 |